(12) United States Patent
Tamborra

(10) Patent No.: US 7,360,369 B2
(45) Date of Patent: Apr. 22, 2008

(54) REFRIGERATED FOOD SAFETY MONITOR

(76) Inventor: Dominick Tamborra, 5075 Edgewater Dr., Orlando, FL (US) 32810

( * ) Notice: Subject to any disclaimer, the term of this patent is extended or adjusted under 35 U.S.C. 154(b) by 501 days.

(21) Appl. No.: 11/103,063

(22) Filed: Apr. 11, 2005

(65) Prior Publication Data

US 2006/0225443 A1 Oct. 12, 2006

(51) Int. Cl.
*G01K 13/00* (2006.01)
*G05D 29/00* (2006.01)
*G08B 17/00* (2006.01)

(52) U.S. Cl. .................. 62/129; 62/157; 62/231; 340/588

(58) Field of Classification Search .............. 62/125, 62/129, 157, 231, 126; 340/585, 588
See application file for complete search history.

(56) References Cited

U.S. PATENT DOCUMENTS 4,041,723 A * 8/1977 Weibel, Jr. et al. ........... 62/126
5,711,160 A * 1/1998 Namisniak et al. ........... 62/125
5,969,606 A * 10/1999 Reber et al. ................ 340/540
6,771,177 B2 * 8/2004 Alderman .................. 340/585

* cited by examiner

*Primary Examiner*—Marc E Norman
(74) *Attorney, Agent, or Firm*—Howard M. Gitten; Edwards Angell Palmer & Dodge LLP

(57) ABSTRACT

A food refrigeration monitor includes a thermometer for measuring the temperature. A switch is operatively coupled to the thermometer and switches from a first state to at least a second state when a thermometer measures a temperature above a predetermined temperature. The switch switches from the at least second state to the first state when the temperature is below the predetermined temperature. A timer is coupled to the switch for measuring an amount of time the switch is in the second state. If the measured time is greater than a predetermined time value, an alarm is sounded.

5 Claims, 2 Drawing Sheets

REFRIGERATED FOOD SAFETY MONITOR

BACKGROUND OF THE INVENTION

This invention is directed to a device for monitoring temperature within a refrigerator, and more particularly for monitoring the conditions within a refrigerator and notifying a user if the food has fallen into the danger zone for refrigerated foods.

In this day and age, refrigerators for both private and commercial use have become ubiquitous. They come in all sizes, all shapes and can be found everywhere from restaurants, to places of work, to personal homes, including outside of the kitchen, such as basements, wet bars, recreation rooms, garages and the like. Almost all foods are stored in a refrigerator at one time or another.

However, refrigerators are subject to breakage, brownouts, blackouts and the like. Brownouts occur in many areas on almost a weekly basis. For this reason, by way of example, it is known to back up computers at the workplace with uninterrupted power sources. Such secondary systems are usually not available for refrigerators, therefore, if in fact power is lost or diminished while a refrigerator user is away from the refrigerator, and power is restored, there is no way to determine that a diminution in the operation of the refrigerator has even occurred, or to what extent the loss of refrigeration may have damaged any foods therein.

By way of example, the Florida Restaurant Association has determined that whenever the temperature of a food subject to spoilage falls between 40° Fahrenheit and 140° Fahrenheit (5° Celsius and 60° Celsius) food is considered to be within the "danger zone". The Florida Restaurant Association has also determined that foods cannot remain for more than four hours in the danger zone before they are no loner safe for consumption. As discussed above, many times, such as when a restaurant is closed for a day or in the domestic situation the homeowner is away for many days, there is no way to determine whether food within the refrigerator has been placed in the danger zone.

Even where there is no brownout, it is not apparent, particularly to homeowners not extremely knowledgeable in food preparation, or maintenance to determine, whether the temperature in the refrigerator is in fact sufficient to maintain the food outside of the danger zone. The longer the food is in the danger zone, the more likely that products such as milk, fish or poultry will grow dangerous bacteria. Typically, someone at home only realizes that food is unsafe for consumption after it is consumed.

If food has been exposed to the danger zone for a prolonged period of time, it is subject to spoilage. One way of being able to tell if a food is spoiled is by odor. However, food may spoil or become unhealthy before an odor is created. In many cases, the odor is not significant enough to raise suspicion regarding the food. Many times, spoiled food may have a spoiled taste. However, in the early stages of spoilage, taste may not be sufficient, or may be masked by other ingredients, as evidenced by the number of cases of food poisoning reported each year. Taste and smell are not sufficient to warn food consumers that food may be unhealthy. The longer the food is in the danger zone, the more likely unhealthy bacteria will grow. However, bacteria growth may be sufficient to be unhealthy to food eaters, but may not be sufficient to provide an odor or a taste to warn the eater of spoilage.

Therefore, a device for determining the existence of the danger zone and the cumulative exposure to the danger zone and notifying the refrigerator user is desired.

BRIEF SUMMARY OF THE INVENTION

A food refrigeration monitor includes a thermometer for measuring the temperature. A switch is operatively coupled to the thermometer and switches from a first state to at least a second state when a thermometer measures a temperature above a predetermined temperature corresponding to food spoilage. The switch switches from the at least second state to the first state when the temperature is below the predetermined temperature. A timer is coupled to the switch for measuring an amount of time the switch is in the second state. If the measured time is greater than a predetermined time value, an alarm is sounded.

BRIEF DESCRIPTION OF THE DRAWINGS

For a fuller understanding of the invention, reference is had to the following description taken in connection with the accompanying drawings in which.

DETAILED DESCRIPTION OF THE INVENTION

Figure 1:
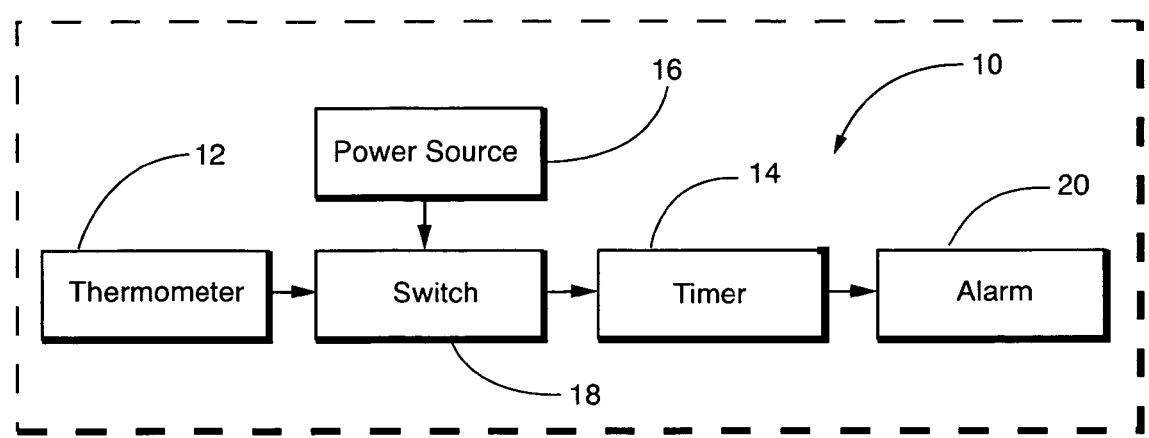
FIG. 1 is a schematic view of a device for monitoring food temperature in accordance with the invention.

Reference is made to FIG. 1 in which a schematic diagram of a monitoring device, generally indicated as 10, constructed in accordance with the invention is provided. Device 10 includes a thermometer 12 and a timer 14. A power source for powering timer 14 is coupled to timer 14 through a switch 18. Time 14 is operatively coupled to an alarm 20. The components of device 10 may be disposed in a housing 22.

Device 10 is placed within a refrigerator. Thermometer 12 measures the ambient temperature within the refrigerator (not shown). If thermometer 12 senses a temperature greater than some predetermined value, 40° Fahrenheit, by way of example, representing the danger zone, thermometer 22 outputs a signal to switch 18.

Switch 18 receives a power input from power source 16. Switch 18 is capable of exhibiting at least two states, which are switched under the control of thermometer 12. In a first state, switch 18 prevents power from power source 16 from flowing to timer 14 and in an at least a second state, switch 18 completes a circuit between power source 16 and timer 14 operating timer 14. The output of thermometer 18 when above the danger zone temperature causes switch 18 to be in the at least second state.

It should be noted that the schematic of FIG. 1 is by way of example only. Thermometer 12 may also be powered by power source 16 so that power source 16 is coupled to both thermometer 12 and switch 18 if thermometer 12 is in fact an electronic, as opposed to a mechanical, thermometer.

Furthermore, if power source 16 provides an input through thermometer 12, then thermometer 12 may also provide the power to timer 14 switched by switch 18. In other words, power source 16 provides an input to thermometer 12 and not switch 18, however, switch 18 still provides power to timer 14 under the control of thermometer 12.

Timer 14 tracks elapsed time when powered. By way of non-limiting example, if switch 18 is in the second state for 20 seconds, timer 14 will register 20 seconds and display 20 seconds. If thermometer 12 senses a temperature above 40° F., by way of example, during a second period for two minutes, switch 18 causes timer 14 to be powered for an additional two minutes. Once the temperature of thermometer 12 falls below 40° F., switch 18 returns to the first state, opening the circuit preventing powering of timer 14. At the end of this second period, timer 14 will display two minutes and 20 seconds. In other words, timer 14 displays elapsed time of exposure to the temperature which causes food spoilage.

Timer 14 may be either a digital elapsed time or analog elapsed timer such as a clock or stopwatch. Furthermore, if a clock, timer 14 may also be capable of tracking the time at which power was first supplied to timer 14 and even track succeeding beginning and ending time periods utilizing a memory chip or analogous mechanical device. This is particularly true if timer 14 is an electronic digital clock.

In a preferred embodiment, power source 16 is a battery, preferably a small sized battery such as an AAA battery. However, the voltage of the battery must be capable of powering timer 14 for at least 4 hours. Timer 14 is capable of storing and displaying the elapsed time even when not operatively coupled to power source 16, such as when the switch is in the first state.

Timer 14 also determines whether the elapsed time is greater than a predetermined value. In our example, the elapsed time resulting in the danger zone is about 4 hours. If the elapsed time exceeds the predetermined time, timer 14 provides an output to an alarm 20. Alarm 20 may be a sound device for creating a siren when food temperature has experienced the danger zone sufficiently to cause spoilage, or may be a visual display such as a red flashing LED. In this way, the user may easily determine that food within the refrigerator has been exposed to the danger zone and may be unhealthy.

It should be noted, as discussed above, that device 10 may beconstructed as an electronic and digital device or as a mechanical analog device. As is known in the art, if electronic and digital, then thermometer 12 and timer 14 would include logic circuitry such as AND and OR gates for determining the presence or absence of a desired state such as whether the predetermined temperature has been sensed by the thermometer and whether the timer has counted the elapsed time.

Figure 2:
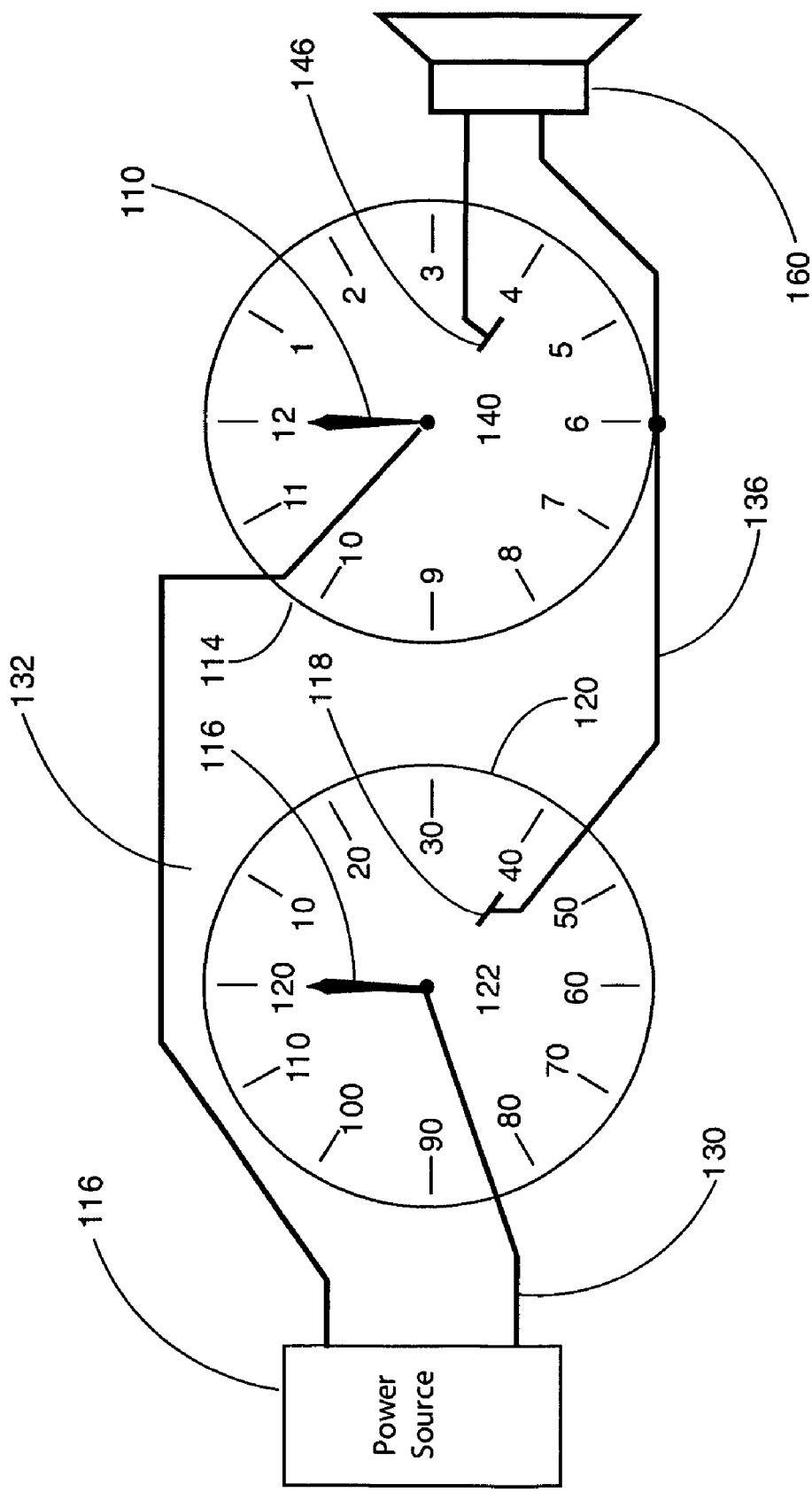
FIG. 2 is a schematic view of a mechanical embodiment of the device for monitoring food temperature in accordance with the invention.

In some situations, a mechanical analog device is better suited for the environment of the interior of a refrigerator. Reference is now made to FIG. 2 in which a mechanical version of the device, generally indicated as 100, is provided. Device 100 includes a thermometer 120. Thermometer 120 includes a face 122, an indicator 124 rotatably mounted on the face. A switch is mounted on face 122 adjacent to the position on the face corresponding to the indicator indicating the predetermined temperature; in this example 40° F. Indicator 124 is electrically connected to power source 116 by a wire 130.

A timer 114 is coupled to power source 116 by a wire 132 on an opposite side of the circuit from wire 130. Timer 114 includes a face 140 and an indicator 142. Wire 132 couples power source 116 to indicator 142. A wire 136 couples timer 114 to switch 118 on face 122 so that when switch 118 is closed by indicator 124 contacting a switch 118 a circuit is complete to power timer 114. In this embodiment, timer 114 is an analog timekeeper having hour markings along face 140 to indicate elapsed time to the nearest hour. It should be understood that timer 114 may also be a mechanical digital device exhibiting elapsed time as a digit such as 0:01 for one minute of elapsed time and 2:00 for two hours of elapsed time.

An alarm shown here as speaker 160 is coupled across power source 116 with timer 114 acting as a switch. A switch 146 is disposed on face 140 of timer 114 at a position corresponding to the danger zone elapsed time. One electrical input to alarm 160 is at switch 146 while the other input is from power source 116. Accordingly, timer indicator 142 comes in contact with switch 146 at a predetermined time, a power circuit is open to power alarm 160 which may be a light bulb, but in this embodiment is a speaker to provide an audible alarm which may be heard through the door of the refrigerator.

Figure 3:
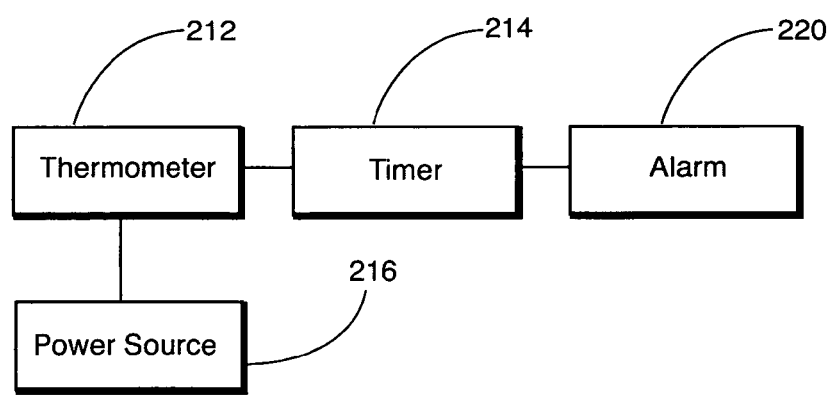
FIG. 3 is a schematic view of a device for monitoring food temperature in accordance with another embodiment of the invention.

Reference is now made to FIG. 3 in which another embodiment of the invention is provided. A monitor, generally indicated as 200, is an electronic embodiment of the invention. Monitor 200 includes a thermometer 212, which receives an input from a power source 216. Thermometer 212 acts as a switch relative to a power signal. When thermometer 212 senses an ambient temperature greater than the predetermined temperature (40° F. by way of example), thermometer 212 outputs a power signal to a timer 214. Thermometer 212 may make use of AND and OR gate logic by way of non-limiting example to provide such a gating switch for the power source signal.

In response to a power source signal output by thermometer 212, timer 214 counts elapsed time. Timer 214 utilizing similar logic circuitry compares the elapsed time to a predetermined elapsed time corresponding to food spoilage at the predetermined temperature. If the elapsed time equals the predetermined time, a power signal is output to alarm 220 which indicates either audibly, visually or both that the conditions within the refrigerator could lead to spoiled and unhealthy food.

By providing an elapsed timer triggered by a thermometer, a device, which provides refrigerator users with the knowledge of whether, the food has reached a danger zone is provided. Furthermore, by utilizing the timer gated by the thermometer, a user can determine the elapsed amount of time of exposure to the danger zone with a simplified device. Furthermore, the device provides a simple mechanism for allowing the user to be able to recognize if the refrigerator is operating properly, i.e., maintaining proper internal temperature. Most importantly, the device provides a quick, simple, automated way of determining whether food contained within the refrigerator is unsafe for consumption as a result of the refrigeration conditions, decreasing the risk of food poisoning.

It should be noted that the above examples were given for food with a danger zone determined as greater than 40° F. for more than four hours. However, other states or other facilities may determine that the danger zone in fact incorporates other time temperature parameters. Furthermore, the monitoring device may be used for frozen foods to determine whether thawing and refreezing has occurred and may be used for non-food perishable items such as medicines.

Thus, while there have been shown, described and pointed out novel features of the present invention as applied to preferred embodiments thereof, it will be understood that various omissions and substitutions and changes in the form and details of the disclosed invention may be made by those skilled in the art without departing from the spirit and scope of the invention. It is the intention, therefore, to be limited only as indicated by the scope of the claims appended hereto.

It is also to be understood that the following claims are intended to cover all of the generic and specific features of the invention herein described and all statements of the scope of the invention, which, as a matter of language, might be said to fall therebetween.

The invention claimed is:

1. A refrigeration temperature time monitoring device comprising:

a thermometer for measuring an ambient temperature within a refrigerator providing an output when said thermometer detects at least a predetermined temperature; and a timer operatively coupled to said thermometer for counting elapsed time in response to the output of said signal from said thermometer;

and a switch operatively coupled between said thermometer and said timer, a power source providing a power input to said switch, said switch switching from a first state to at least a second state when said thermometer measures a temperature above said predetermined temperature and exhibiting said first state when said temperature is below said predetermined temperature, said switch outputting a power signal to said timer when said switch is in said second state, said timer counting an elapsed time in response to said power signal, said thermometer including a face having an analog indicator rotatably mounted on the face moving about said face to indicate measured temperature, said analog indicator electrically coupled to the power source for receiving the power signal and, the switch being disposed on the face at a position corresponding to a position at which said analog indicator indicates measurement of said predetermined temperature;

said timer being coupled to said switch and said power source so that said analog indicator moving to a position corresponding to said predetermined temperature closes a circuit to power said timer by providing the power input to said timer.

2. The monitoring device of claim 1, wherein said predetermined temperature corresponds to a temperature at which food will spoil if food is exposed to said temperature for a predetermined time.

3. The monitoring device of claim 1, wherein said predetermined time corresponds to the time period at which food spoils if exposed to the at least a predetermined temperature.

4. The monitoring device of claim 1, wherein said timer determines an elapsed time in response to said power input.

5. The monitoring device of claim 4, wherein said timer is an analog clock having a clock face and a timer hand indicator, a timer switch disposed on said face at a position corresponding to said timer hand indicator moving along said face to indicate said elapsed time, and further comprising an alarm coupled to said timer switch for emitting an alarm when said timer hand indicator is at said position corresponding to said timer hand indicator indicating said elapsed time.

* * * * *